(12) United States Patent
Chen et al.

(10) Patent No.: US 11,445,092 B2
(45) Date of Patent: Sep. 13, 2022

(54) CAMERA MODULE

(71) Applicant: Chicony Electronics Co., Ltd., New Taipei (TW)

(72) Inventors: Wei-Cheng Chen, New Taipei (TW); Tsung-You Wang, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 220 days.

(21) Appl. No.: 16/812,387

(22) Filed: Mar. 9, 2020

(65) Prior Publication Data

US 2021/0105390 A1  Apr. 8, 2021

(30) Foreign Application Priority Data

Oct. 8, 2019 (TW) ................................. 108136449

(51) Int. Cl.
*H04N 5/225* (2006.01)

(52) U.S. Cl.
CPC ....... *H04N 5/22521* (2018.08); *H04N 5/2254* (2013.01)

(58) Field of Classification Search
CPC .......................... H04N 5/22521; H04N 5/2254
See application file for complete search history.

(56) References Cited

U.S. PATENT DOCUMENTS

| | | | |
|---|---|---|---|
| 2004/0135482 A1* | 7/2004 | Thielemans | H01L 51/529 313/22 |
| 2007/0217786 A1* | 9/2007 | Cho | H04N 5/2253 396/542 |
| 2012/0035418 A1* | 2/2012 | Talbert | A61B 1/00016 600/109 |
| 2015/0087180 A1* | 3/2015 | Wu | G02B 6/4269 439/485 |
| 2015/0260886 A1* | 9/2015 | Higuchi | G02B 5/22 257/432 |
| 2019/0199894 A1* | 6/2019 | Ma | H04N 5/22521 |
| 2021/0157079 A1* | 5/2021 | Taylor | H02G 3/16 |

FOREIGN PATENT DOCUMENTS

| | | | |
|---|---|---|---|
| CN | 204498224 U | * | 7/2015 |
| CN | 204498224 U | | 7/2015 |
| CN | 104994259 A | | 10/2015 |
| TW | 201340698 A | | 10/2013 |
| TW | M550941 U | | 10/2017 |

* cited by examiner

*Primary Examiner* — Thanh Luu
*Assistant Examiner* — Monica T Taba
(74) *Attorney, Agent, or Firm* — CKC & Partners Co., LLC

(57) ABSTRACT

A camera module includes a circuit board, an image sensor, a filter removable switch, a camera lens, and a thermally conductive structure. The circuit board has a surface. The image sensor is disposed on the surface. The filter removable switch is located over the surface. The camera lens is on the light-sensing path of the image sensor. The thermally conductive structure is contacted between the circuit board and the filter removable switch and has a channel. The image sensor is located in the channel.

13 Claims, 4 Drawing Sheets

CAMERA MODULE

CROSS-REFERENCE TO RELATED APPLICATION

This application claims priority to Taiwan Application Serial Number 108136449, filed Oct. 8, 2019, which is herein incorporated by reference.

BACKGROUND

Technical Field

The present disclosure relates to a camera module.

Description of Related Art

An image capture device is a device that converts optical images into electronic signals and is widely used in digital cameras and other electronic and optical devices. Early image capture devices used analog signals for their sensors, such as video camera tubes. Today, photosensitive elements are mainly divided into two types: charge-coupled devices (CCD) and complementary metal-oxide-semiconductor (CMOS) active pixel sensors.

Generally speaking, the heat conduction through surface contact is the most direct way to dissipate heat from electronic components. For a conventional image capture device, its image sensor can only conduct heat away through the heat dissipation element on the back of the circuit board. However, since the heat of the image sensor is blocked by the circuit board, the heat conduction efficiency is poor. Even if a through-circuit is further provided in the circuit board in order to increase the heat conduction efficiency, the through-circuit is often limited due to the crowded surface space of the circuit board, so that its effect cannot be effectively exerted.

Accordingly, how to provide a camera module to solve the aforementioned problems becomes an important issue to be solved by those in the industry.

SUMMARY

An aspect of the disclosure is to provide a camera module which can effectively solve the aforementioned problems.

According to an embodiment of the disclosure, a camera module includes a circuit board, an image sensor, a filter removable switch, a camera lens, and a thermally conductive structure. The circuit board has a surface. The image sensor is disposed on the surface. The filter removable switch is located over the surface. The camera lens is on the light-sensing path of the image sensor. The thermally conductive structure is contacted between the circuit board and the filter removable switch and has a channel. The image sensor is located in the channel.

In an embodiment of the disclosure, the thermally conductive structure is at least partially compressible.

In an embodiment of the disclosure, the thermally conductive structure has two contacting surfaces. The two contacting surfaces respectively contact the circuit board and the filter removable switch. The two contacting surfaces are compressible.

In an embodiment of the disclosure, the thermally conductive structure includes at least one thermal pad.

In an embodiment of the disclosure, a number of the at least one thermal pad is two. The two thermal pads respectively contact the circuit board and the filter removable switch.

In an embodiment of the disclosure, the two thermal pads are compressible.

In an embodiment of the disclosure, the thermally conductive structure further includes a metal block contacted between the two thermal pads. The channel runs through the two thermal pads and the metal block.

In an embodiment of the disclosure, the thickness of the metal block is greater than the thickness of each of the thermal pads.

In an embodiment of the disclosure, the thermal conductivity of the metal block is greater than the thermal conductivity of each of the thermal pads.

In an embodiment of the disclosure, the thermally conductive structure includes a metal block and a light absorption layer. The metal block is thermally connected between the circuit board and the filter removable switch and has an inner wall surface forming at least a part of the channel. The light absorption layer is completely coated on the inner wall surface.

In an embodiment of the disclosure, the filter removable switch includes a metal plate. The filter removable switch contacts the thermally conductive structure with the metal plate.

In an embodiment of the disclosure, the circuit board further has a metal circuit layer. The metal circuit layer is partially exposed from the surface and contacts the thermally conductive structure.

In an embodiment of the disclosure, a portion of the metal circuit layer exposed from the surface is ring-shaped.

Accordingly, in the camera module of the present disclosure, the heat generated by the image sensor is conducted to the filter removable switch through the thermally conductive structure disposed on the same side of the circuit board as the image sensor to achieve heat dissipation. Since the heat transfer path does not need to reach the other side of the circuit board, the heat conduction efficiency can be effectively improved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
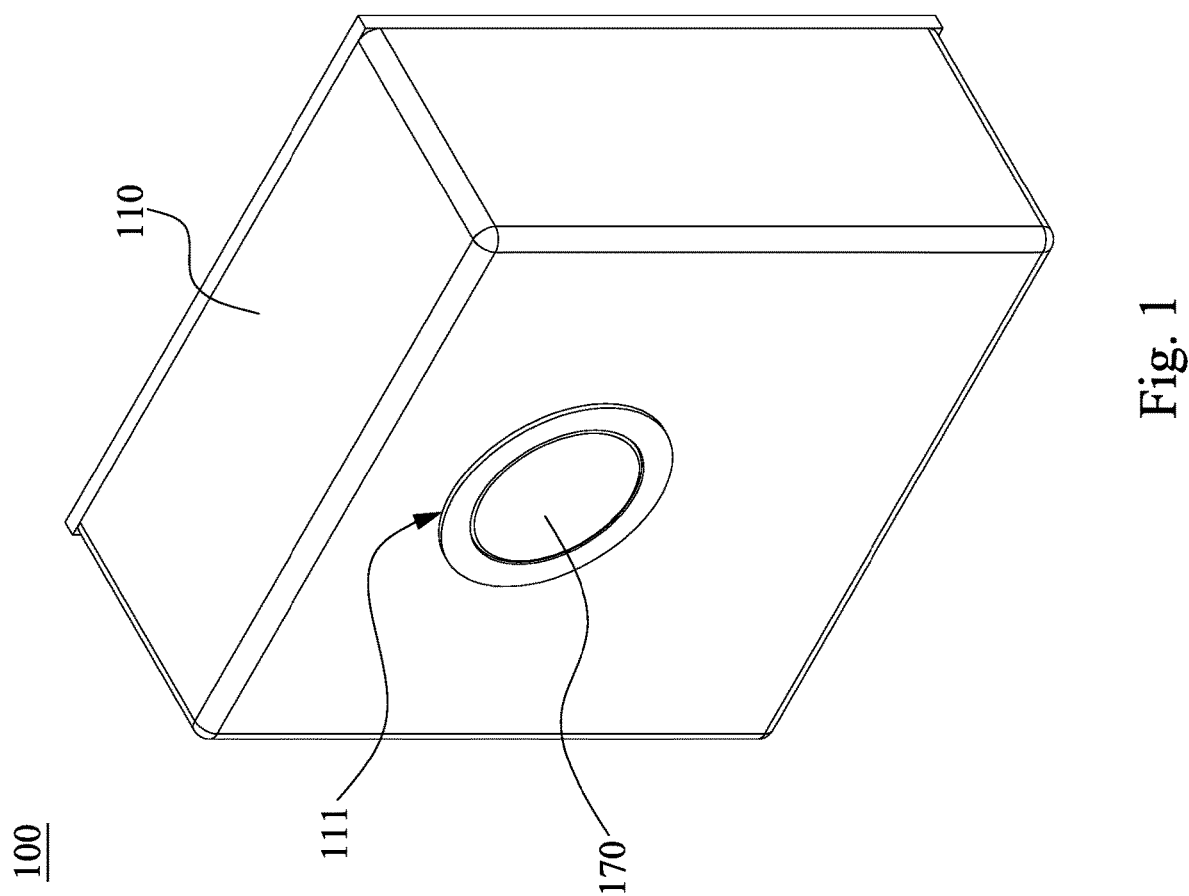
FIG. 1 is a perspective view of a camera module according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

However, specific structural and functional details disclosed herein are merely representative for purposes of describing exemplary embodiments, and thus may be embodied in many alternate forms and should not be construed as limited to only exemplary embodiments set forth herein. Therefore, it should be understood that there is no intent to limit exemplary embodiments to the particular forms disclosed, but on the contrary, exemplary embodiments are to cover all modifications, equivalents, and alternatives falling within the scope of the disclosure.

Figure 2A:
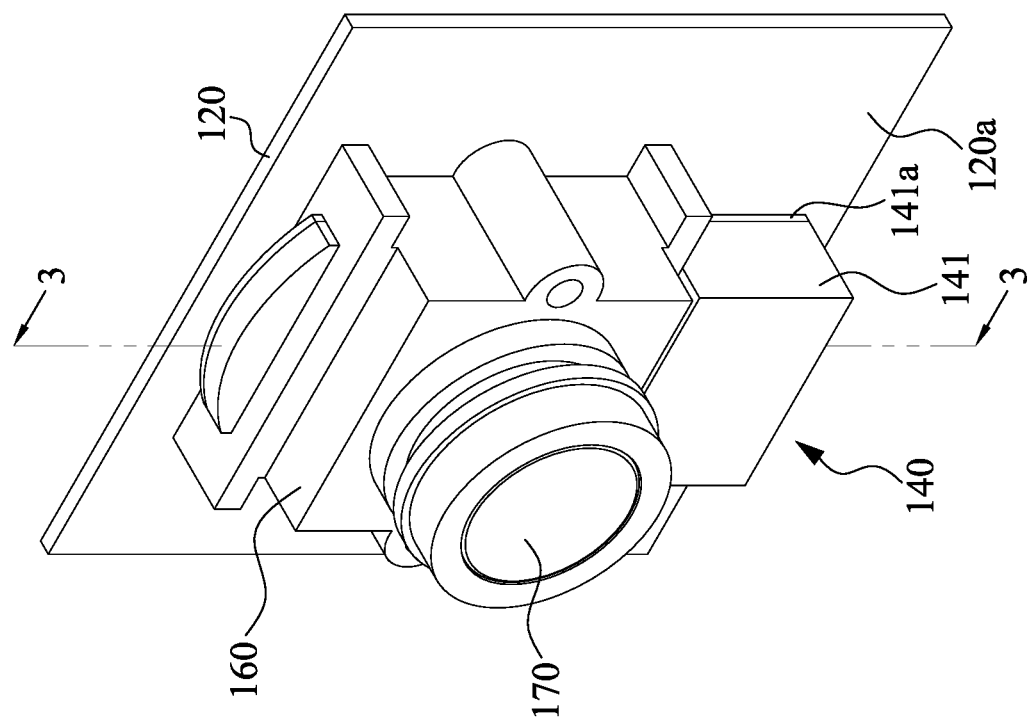
FIG. 2A is a perspective view of components inside the camera module according to an embodiment of the disclosure.
Figure 2B:
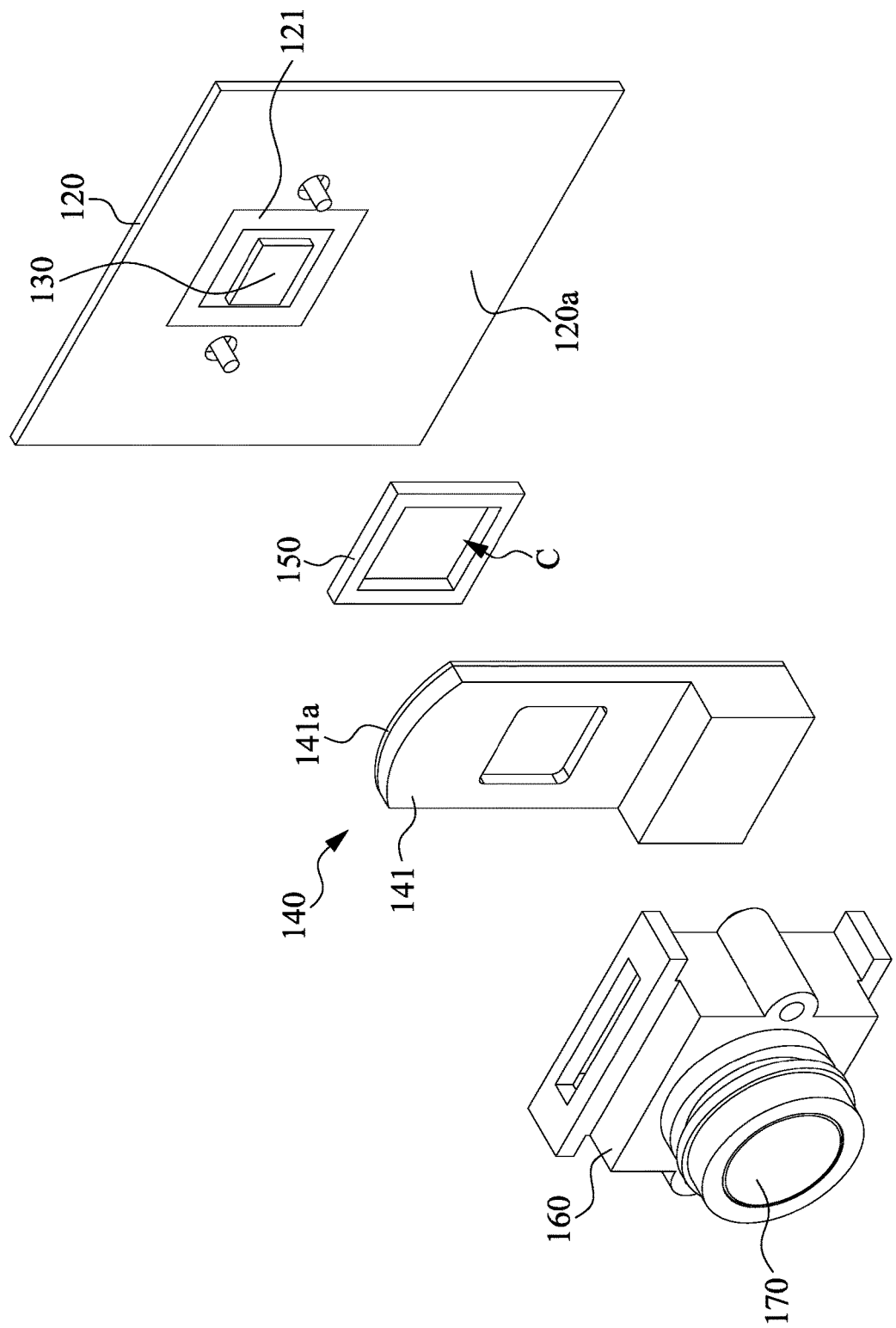
FIG. 2B is an exploded view of the components shown in FIG. 2A.
Figure 3:
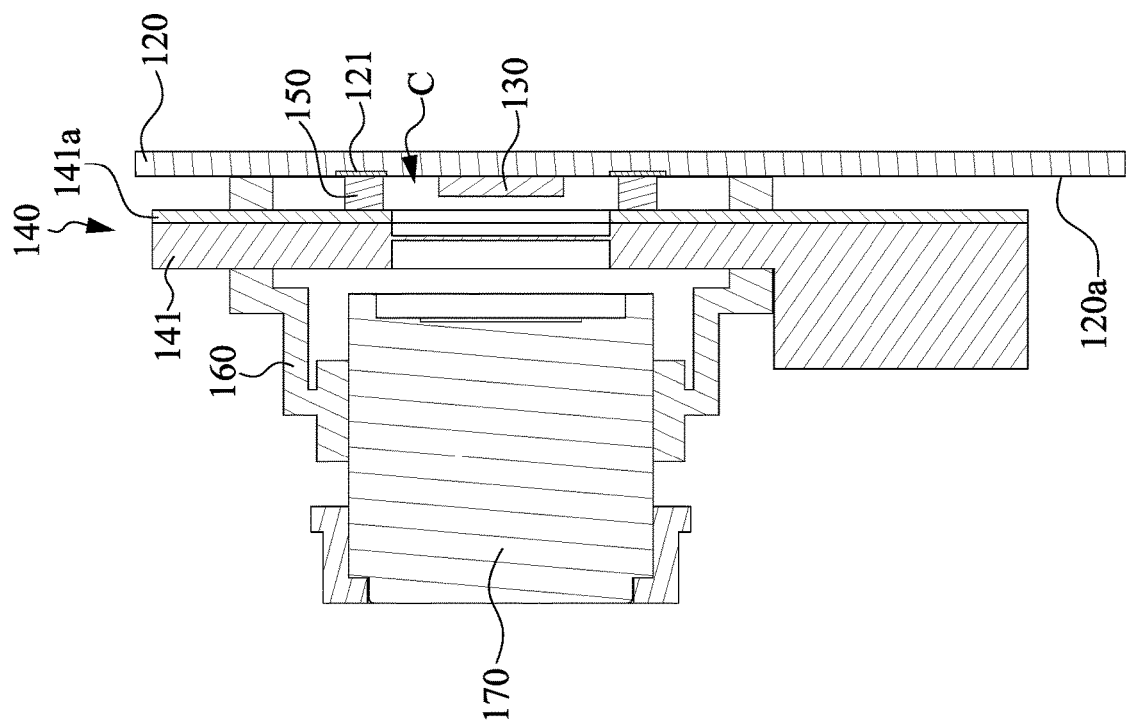
FIG. 3 is a cross-sectional view of the components shown in FIG. 2A taken along line 3-3.

Reference is made to FIGS. 1A to 3. FIG. 1 is a perspective view of a camera module 100 according to an embodiment of the disclosure. FIG. 2A is a perspective view of components inside the camera module 100 according to an embodiment of the disclosure. FIG. 2B is an exploded view of the components shown in FIG. 2A. FIG. 3 is a cross-sectional view of the components shown in FIG. 2A taken along line 3-3. The structure and function of each component and the connection relationships among the components included in the camera module 100 of this embodiment will be described in detail below.

As shown in FIGS. 1A to 3, in the present embodiment, the camera module 100 includes a casing 110, and a circuit board 120, an image sensor 130, a filter removable switch 140, a thermally conductive structure 150, a lens holder 160, and a camera lens 170 are located in the casing 110. The circuit board 120 has a surface 120a. The image sensor 130 is disposed on the surface 120a of the circuit board 120. The filter removable switch 140 is disposed over the surface 120a of the circuit board 120. The filter removable switch 140 is capable of selectively filtering a particular type of light by operation, so that only other types of light other than the particular type of light are allowed to pass through. For example, the filter removable switch 140 is an infrared filter switch, which can selectively filter infrared light so as to allow only other types of light other than infrared light to pass through, but the disclosure is not limited in this regard. The thermally conductive structure 150 is located between the circuit board 120 and the filter removable switch 140 and contacted by the circuit board 120 and the filter removable switch 140. The thermally conductive structure 150 has a channel C. That is, the thermally conductive structure 150 is substantially ring-shaped, as shown in FIG. 2B. The image sensor 130 is located in the channel C. The lens holder 160 is disposed on the surface 120a of the circuit board 120 and the filter removable switch 140 is fixed to the lens holder 160. In some embodiments, the lens holder 160 is fastened to the circuit board 120 through screws, but the disclosure is not limited in this regard. In some embodiments, the filter removable switch 140 is fixed to the lens holder 160 by adhesive manner, but the disclosure is not limited in this regard. In addition, the casing 110 has a through hole 111. The camera lens 170 is fixed to the lens holder 160 and is engaged with the through hole 111 of the casing 110 to be exposed outside the casing 110. The camera lens 170 is on the light-sensing path of the image sensor 130 whereby the image sensor 130 captures a scene outside the casing 110 through the camera lens 170 to generate a corresponding image. Furthermore, the filter removable switch 140 is also on the light-sensing path of the image sensor 130, such that the filter removable switch 140 selectively allows only certain types of light to reach the image sensor 130. In other words, external light passing through the camera lens 170 and the filter removable switch 140 enters the channel C of the thermally conductive structure 150 and reaches the image sensor 130. In the present embodiment, the filter removable switch 140 is located between the camera lens 170 and the image sensor 130. The external light passing through the camera lens 170 can be filtered by the filter removable switch 140 and then enters the channel C of the thermally conductive structure 150 to reach the image sensor 130.

With the foregoing structural configurations, the heat generated by the image sensor 130 can be conducted to the filter removable switch 140 through the thermally conductive structure 150 disposed on the same side of the circuit board 120 as the image sensor 130 to achieve heat dissipation. Since the heat transfer path does not need to reach the other side of the circuit board 120, the heat conduction efficiency can be effectively improved.

In some embodiments, the thermally conductive structure 150 is a thermal pad. The thermally conductive structure 150 is compressible, so that two contacting surfaces of the thermally conductive structure 150 that respectively contact the circuit board 120 and the filter removable switch 140 are compressible. Therefore, the compressible thermally conductive structure 150 can be ensured to contact the circuit board 120 and the filter removable switch 140 in the form of surface contact, thereby effectively reducing thermal resistance.

In some embodiments, the thermally conductive structure 150 is made of opaque material, so it can provide light shielding effect, and the surrounding stray light can be prevented from reaching the image sensor 130 through the gap between the circuit board 120 and the filter removable switch 140 to affect the imaging quality.

In some embodiments, as shown in FIG. 3, the filter removable switch 140 includes a housing 141. A part of the housing 141 is constituted by a metal plate 141a. The other parts of the housing 141 are made of plastic, for example. The filter removable switch 140 contacts the thermally conductive structure 150 with the metal plate 141a, and can further guide the heat generated by the image sensor 130 to the metal plate 141a without being accumulated in the thermally conductive structure 150. In addition, the metal plate 141a also provides a larger area to dissipate heat into the air. In some embodiments, the metal plate 141a can be made from a metal substrate through a stamping process, but the disclosure is not limited in this regard. In some other embodiments, the housing 141 of the filter removable switch 140 may also be made entirely of metal.

In some embodiments, as shown in FIGS. 2B and 3, the circuit board 120 further has a metal circuit layer 121. The metal circuit layer 121 is partially exposed from the surface 120a of the circuit board 120 and contacts the thermally conductive structure 150. Hence, the metal circuit layer 121 can quickly conduct the heat generated by the image sensor 130 to the thermally conductive structure 150, thereby further improving the heat conduction efficiency. In some embodiments, the portion of the metal circuit layer 121 exposed from the surface 120a of the circuit board 120 is ring-shaped, and its shape substantially matches the shape of the contact surface of the thermally conductive structure 150 for contacting the circuit board 120, thereby further improving the heat conduction efficiency.

Figure 4:
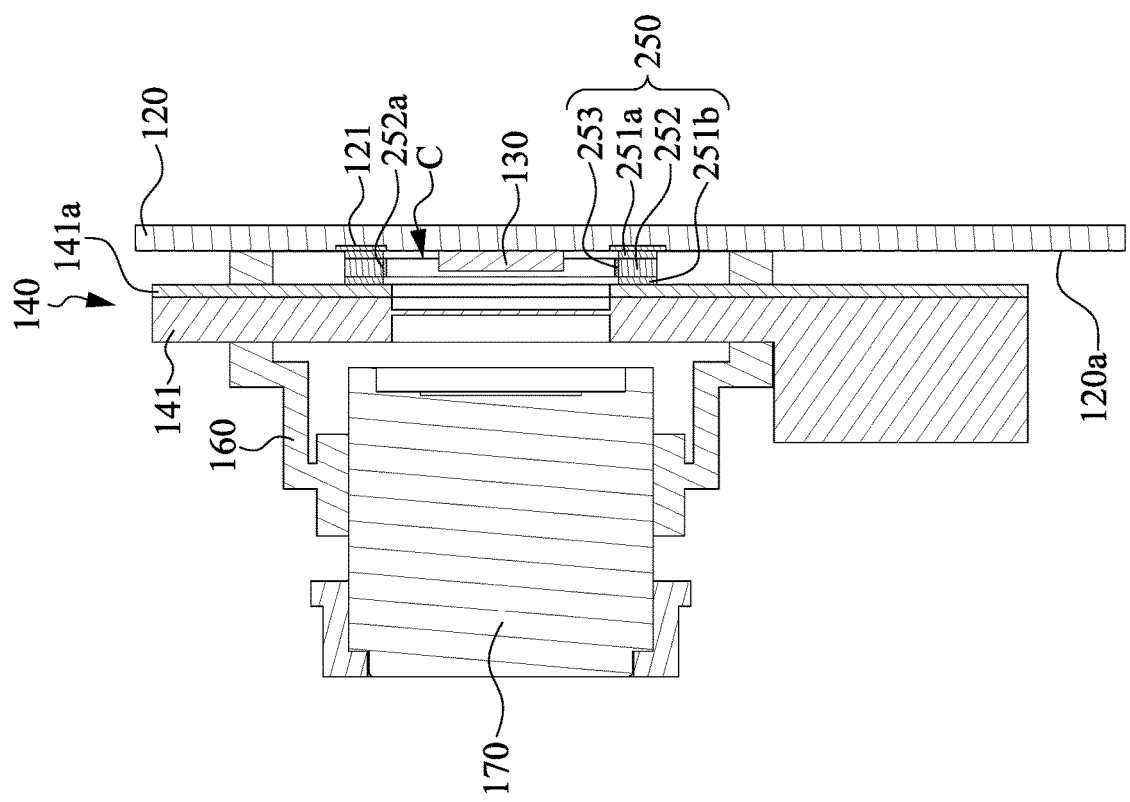
FIG. 4 is a cross-sectional view of components inside the camera module according to another embodiment of the disclosure.

Reference is made to FIG. 4. FIG. 4 is a cross-sectional view of components inside the camera module 100 according to another embodiment of the disclosure. The present embodiment modifies the thermally conductive structure 150 in the embodiment shown in FIG. 3, so the components such as the circuit board 120, the image sensor 130, the filter removable switch 140, the lens holder 160, and the camera lens 170 can be referred to the related descriptions above, and details are not described herein.

Specifically, in the present embodiment, the thermally conductive structure 250 includes two thermal pads 251a, 251b and a metal block 252. The two thermal pads 251a, 251b respectively contact the circuit board 120 and the filter removable switch 140. The metal block 252 is contacted between the two thermal pads 251a, 251b, so as to be thermally connected between the circuit board 120 and the filter removable switch 140. The so-called "thermally connected" can refer to the ability to transfer heat after connection. The channel C runs through the two thermal pads 251a, 251b and the metal block 252. That is, the two thermal pads 251a, 251b and the metal block 252 are substantially ring-shaped. The two thermal pads 251a, 251b are compressible, such that two contacting surfaces of the two thermal pads 251a, 251b that respectively contact the circuit board 120 and the filter removable switch 140 and other two contacting surfaces of the two thermal pads 251a, 251b that contact the metal block 252 are also compressible, so as to be closely attached to the circuit board 120, the filter removable switch 140, and the metal block 252. Therefore, the compressible two thermal pads 251a, 251b can be ensured to contact the circuit board 120, the filter removable switch 140, and the metal block 252 in the form of surface contact, thereby effectively reducing thermal resistance.

In some embodiments, the materials of the two thermal pads 251a, 251b in the present embodiment are the same as those of the thermally conductive structure 150 shown in FIG. 3. The thickness of the thermally conductive structure 250 in the present embodiment is substantially the same as that of the thermally conductive structure 150 shown in FIG. 3. The thickness of the metal block 252 in the present embodiment is greater than the thickness of each of the two thermal pads 251a, 251b, and the thermal conductivity of the metal block 252 is greater than the thermal conductivity of each of the two thermal pads 251a, 251b. As a result, the overall thermal conductivity of the thermally conductive structure 250 in the present embodiment can be greater than that of the thermally conductive structure 150 shown in FIG. 3.

In some embodiments, the metal block 252 has an inner wall surface 252a forming at least a part of the channel C. The thermally conductive structure 250 further includes a light absorption layer 253. The light absorption layer 253 is completely coated on the inner wall surface 252a of the metal block 252. In this way, in the process of external light reaching the image sensor 130 through the camera lens 170, the filter removable switch 140, and the thermally conductive structure 250, it is possible to prevent the light from being reflected by the inner wall surface 252a of the metal block 252 and affect the imaging quality of the image sensor 130.

According to the foregoing recitations of the embodiments of the disclosure, it can be seen that in the camera module of the present disclosure, the heat generated by the image sensor is conducted to the filter removable switch through the thermally conductive structure disposed on the same side of the circuit board as the image sensor to achieve heat dissipation. Since the heat transfer path does not need to reach the other side of the circuit board, the heat conduction efficiency can be effectively improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A camera module, comprising:
   a circuit board having a surface;
   an image sensor disposed on the surface;
   a lens holder disposed on the surface and having an inner space;
   a filter removable switch located over the surface;
   a camera lens on a light-sensing path of the image sensor; and
   a thermally conductive structure contacted between the circuit board and the filter removable switch and having a channel, wherein the image sensor is located in the channel and the thermally conductive structure is located in the inner space of the lens holder, and an outer side surface of the thermally conductive structure and an inner side surface of the lens holder face each other and are spaced apart from each other.

2. The camera module of claim 1, wherein the thermally conductive structure is at least partially compressible.

3. The camera module of claim 2, wherein the thermally conductive structure has two contacting surfaces respectively contacting the circuit board and the filter removable switch, and the two contacting surfaces are compressible.

4. The camera module of claim 1, wherein the thermally conductive structure comprises at least one thermal pad.

5. The camera module of claim 4, wherein a number of the at least one thermal pad is two, and the two thermal pads respectively contact the circuit board and the filter removable switch.

6. The camera module of claim 5, wherein the two thermal pads are compressible.

7. The camera module of claim 5, wherein the thermally conductive structure further comprises a metal block contacted between the two thermal pads, and the channel runs through the two thermal pads and the metal block.

8. The camera module of claim 7, wherein a thickness of the metal block is greater than a thickness of each of the thermal pads.

9. The camera module of claim 7, wherein a thermal conductivity of the metal block is greater than a thermal conductivity of each of the thermal pads.

10. The camera module of claim 1, wherein the thermally conductive structure comprises:
    a metal block thermally connected between the circuit board and the filter removable switch and having an inner wall surface forming at least a part of the channel; and
    a light absorption layer completely coated on the inner wall surface.

11. The camera module of claim 1, wherein the filter removable switch comprises a metal plate, and the filter removable switch contacts the thermally conductive structure with the metal plate.

12. The camera module of claim 1, wherein the circuit board further has a metal circuit layer partially exposed from the surface of the circuit board and contacting the thermally conductive structure.

13. The camera module of claim 12, wherein a portion of the metal circuit layer exposed from the surface of the circuit board has a closed ring shape.

* * * * *